Jan. 2, 1968 R. KONIAN 3,361,976

FREQUENCY CORRECTION SYSTEM

Filed April 24, 1964

INVENTOR.
RICHARD KONIAN
BY J. L. Whittaker
Attorney 3,361,976
FREQUENCY CORRECTION SYSTEM
Richard Konian, Long Island City, N.Y., assignor to Radio Corporation of America, a corporation of Delaware
Filed Apr. 24, 1964, Ser. No. 362,406
2 Claims. (Cl. 325—421)

ABSTRACT OF THE DISCLOSURE

A system is disclosed for correcting time variant frequency errors which occur during transmission of a signal over a communication path. A reference component which contains the frequency error is derived from the received signal and shifted in frequency by means of a first local frequency standard to produce a compensating signal. The compensating signal is combined with a delayed portion of the reecived signal to affect a cancellation of the frequency error. The resultant signal is then shifted in frequency by means of a second local frequency standard to reproduce the original received signal frequencies.

Figures 1, 2:
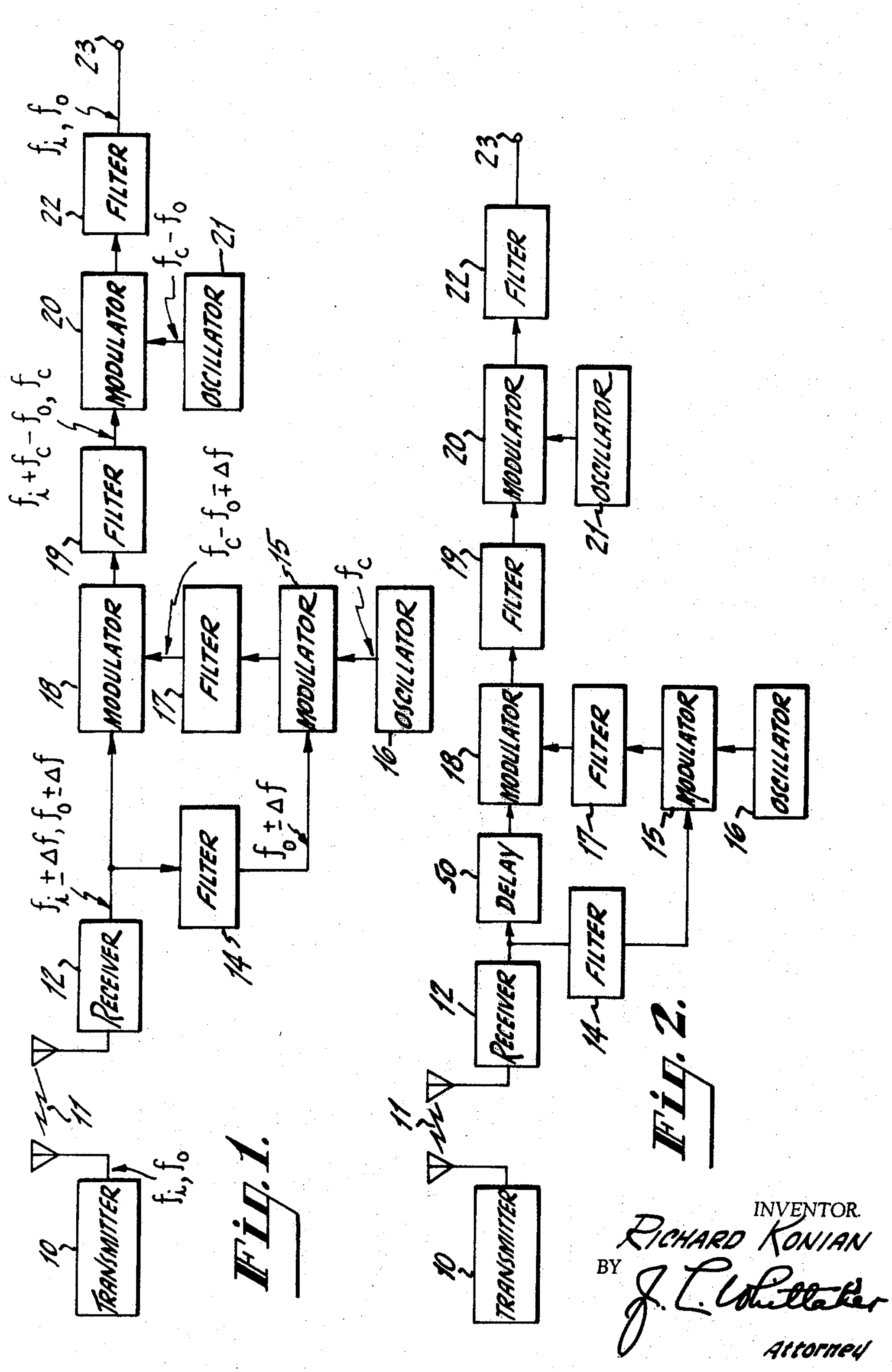

The transmission of signals over a communication path often results in unwanted shifts in the signal frequency. Such shifts in frequency are usually random in nature and occur in substantially all types of communication systems regardless of the modulation process or transmission medium. For example, in radio communication systems, shifts in frequency can be introduced due to a Doppler effect when the radio signal is reflected from a moving body, e.g. water, clouds, satellites. In communication systems using a cable network, microwave relay facilities and/or other means for forwarding a signal over long distances, the frequency of the signal may be purposefully changed several times as the signal is fed over successive portions of the communication path. Limitations in the accuracy with which the different frequencies can be generated in such a system introduce errors in the form of unwanted, random changes in the signal frequency. There are many applications, for example, frequency division multiplex systems, where such random changes in frequency can not be tolerated.

Frequency correction systems have been suggested which make use of some type of feedback technique. The unwanted and random frequency shifts in a received signal are evaluated and a control signal produced. The control signal is fed back to the input of the correction system in a manner to correct the frequency error. One source of inaccuracy in feedback correction systems stems from the time-response limitations inherent in a feedback system. Since the correction signal is derived from one point in the signal path and then fed back to a previous point in the signal path at which point correction takes place, the signal interval which undergoes frequency correction is not exactly the same interval from which the correction or control signal was derived. The timing problems resulting from such an operation act to limit the degree of accuracy possible by a feedback loop arrangement.

It is therefore an object of the present invention to provide an improved frequency correction system.

It is a further object to provide an improved frequency correction system in which a novel feed-forward technique is used to detect and correct frequency errors in a signal received after transmission over a communication path.

Briefly, in the embodiment of the invention described herein, frequency correction is accomplished by deriving from a signal received over a communication path a signal component which contains the frequency error to be corrected. The signal component is processed by modulation and filtering techniques to obtain a compensating or correcting signal. The compensating signal is then fed forward and processed with the received signal in such a way that the frequency error is substantially removed. The use of a feed-forward technique permits the frequency correction to be made on substantially the same signal interval from which the correction signal is derived. Thus, inaccuracies due to timing factors encountered in prior art arrangements are avoided. A frequency correction system is provided which is capable of accurate and precise operation while also being of a simple operation and construction.

A more detailed description of the invention will now be given in connection with the accompanying drawing, in which:

FIG. 1 is a block diagram of a frequency correction system constructed according to one embodiment of the invention, and FIG. 2 is a block diagram of a second embodiment of the invention.

A typical communication path is shown in FIG. 1. The communication path includes a transmitter 10, a transmission medium 11, and a receiver 12. The transmission medium 11 can take the form of a cable network, a microwave relay system, a radio system, or any other arrangement for forwarding a signal between the signal source represented by the transmitter 10 and the receiving means represented by the receiver 12. The transmitter 10 and the receiver 12 will be in a form suitable for the particular transmission medium 11 used. The signal appearing at the output of the receiver 12 is fed to a first amplitude modulator 18, which is preferably but not necessarily of the balanced type, and to a filter 14. The characteristics of the filter 14 depend on the frequencies of the received signal, as will be explained below, but the filter 14 is generally of the low-pass or band-pass type. The output of the filter 14 is fed to the input of a second amplitude modulator 15 similar to the first, and again preferably of the balanced type.

A second input to the modulator 15 is a local reference signal obtained from an oscillator 16 which for stability reasons is preferably a crystal oscillator. The output of the second modulator 15 is fed to the first modulator 18 through a band-pass filter 17. Filter 17 operates to pass to the first modulator 18 only one sideband of the signal appearing at the output of the second modulator 15. The output of the first modulator 18 is fed through a second sideband filter 19 to a third amplitude modulator 20. The characteristics of the filters 17 and 19 are such that one passes the lower sideband and the other passes the upper sideband. Thus if the filter 17 is a lower sideband filter, filter 19 is an upper sideband filter. The third modulator 20 can be of the same construction as the first and second modulators 18 and 15, respectively. A second input to the third modulator 20 is obtained from the output of a second oscillator 21 which, like the first oscillator 16, is preferably of the crystal type. The output of the third modulator 20 is fed to a lower sideband filter 22 from which an output signal is obtained at an output terminal 23.

In the operation of the embodiment shown in FIG. 1, the signal appearing at the output of the transmitter 10 is assumed to be one which includes at least two components, an information component of frequency $f_1$ and an isolable reference component of frequency $f_0$. This signal may be generated in many ways. For example, the information component may be some type of modulated signal. In the cases where no carrier or other reference component is normally present, an isolable reference or pilot component is added to the signal generated at the transmitter 10. Such an addition may be accomplished by well-known techniques.

The frequency $f_0$ of the reference component generated at the transmitter 10 should be constant to the desired degree of accuracy. It should be such that the reference component can be isolated from the signal received at receiver 12. At the same time, the reference component frequency $f_0$ should be close enough to the information component frequency $f_i$ so that both components undergo substantially the same frequency error as the signal is forwarded over the transmission medium 11.

The receiver 12, which may include the usual amplifying, demodulating, and other signal processing means required with the type of transmission medium 11 employed, produces at its output a signal including the information component which has undergone a positive or negative frequency error $\pm\Delta f$ during its travel over the communication path 10, 11, 12. The received signal also includes the reference component which has undergone substantially the same frequency error. Thus, the frequencies of the information and reference components appearing at the output of the receiver 12 are $f_i\pm\Delta f$ and $f_0\pm\Delta f$, respectively.

The reference component of frequency $f_0\pm\Delta f$ is filtered from the signal appearing at the output of the receiver 12 by the filter 14 and is fed to an input of the amplitude modulator 15. A signal of frequency $f_c$ generated by the oscillator 16 and fed to the amplitude modulator 15 is amplitude modulated by the received reference component.

As pointed out above, the filter 17 may pass either the upper or lower sideband of the signal at the output of the modulator 18 provided the filter 19 passes the opposite sideband. For purposes of the present discussion it will be assumed that the filter 17 is a lower sideband filter. Thus the frequency of the signal at its output is $$f_c-f_0\mp\Delta f$$

This signal is fed to one input of the amplitude modulator 18.

The sign of the error frequency $\Delta f$ in the lower sideband signal at the output of the filter 17 is indicated as inverted with respect to that in the signal appearing at the output of the receiver 12. Assuming for the moment that the signal received over the transmission medium 11 has undergone an increase in frequency or $+\Delta f$ as compared to the original frequency of the signal at the output of the transmitter 10, the frequency of the reference component as applied to the modulator 15 is equal to the original reference component frequency plus the frequency error or $f_0+\Delta f$. The modulator 15 produces by the usual modulation process a signal including a lower sideband having the frequency $f_c-(f_0+\Delta f)$ or $f_c-f_0-\Delta f$. The frequency of the lower sideband signal is decreased by the same amount that the frequency of the reference component is increased. If the frequency of the received signal has undergone a decrease in frequency or $-\Delta f$, the frequency of the lower sideband included in the signal generated by the modulator 15 becomes $$f_c-(f_0-\Delta f)$$

or $$f_c-f_0+\Delta f$$

The frequency of the lower sideband signal is increased by the same amount that the frequency of the reference component is decreased. The frequency of the lower sideband signal is shifted from the frequency $f_c-f_0$ by the amount $\Delta f$ in a direction opposite to the direction in which the reference component frequency $f_0$ has changed.

The modulator 18 operates to modulate the signal of frequency $f_c-f_0\mp\Delta f$ appearing at the output of the filter 17 with the received signal of frequencies $f_i\pm\Delta f$, $f_0\pm\Delta f$. Assuming for the moment that the frequency error $\Delta f$ represents an increase of the signal frequency at the output of the receiver 12, the modulator 18 operates to produce a first upper sideband signal having the frequency $$f_i+\Delta f+f_c-f_0-\Delta f$$

or $$f_i+f_c-f_0$$

A second upper sideband signal is also produced having the frequency $f_0+\Delta f+f_c-f_0-\Delta f$ or $f_c$. If instead the frequency error $\Delta f$ represents a decrease of the signal frequency at the output of the receiver 12, the modulator 18 now operates to produce a first upper sideband signal having the frequency $f_i-\Delta f+f_c-f_0+\Delta f$ or $f_i+f_c-f_0$. A second upper sideband signal is also produced having the frequency $$f_0-\Delta f+_c-f_0+\Delta f \text{ or } f_c$$

The frequencies of the upper sideband signals appearing at the output of the modulator 18 remain the same regardless of the direction or amount of the frequency error $\Delta f$. By the feed-forward technique employed, a correction signal of frequency $f_c-f_0\mp\Delta f$ is produced which, when modulated with the received signal, acts to produce a further signal in which the frequency error present in the received signal is offset or cancelled.

The filter 19 operates as an upper sideband filter to pass the signals of frequencies $f_i+f_c-f_0$ and $f_c$ appearing at the output of the modulator 18. The frequencies of the reference component and of the information component at the output of the filter 19 are equal to the frequencies of the respective components as originally generated by the transmitter 10 shifted upwards by the frequency $f_c-f_0$. In other words, the combination of the amplitude modulator 18 and the upper sideband filter 19 acts as a frequency shifting means to increase the frequency of the received signal by an amount equal to the frequency at the output of the filter 17. It follows, therefore, that the frequency of the information component and of the reference component can be returned to the original frequency by lowering the frequency of respective signal components appearing at the output of the filter 19 a corresponding amount.

One way of performing this frequency shifting operation is shown in FIG. 1. The signal components at the output of the filter 19 are fed to the amplitude modulator 20. The oscillator 21 generates a signal at the frequency $f_c-f_0$ which is applied to the modulator 20. The modulator 20 operates to produce a first signal component having a lower sideband of the frequency $$f_i+f_c-f_0-(f_c-f_0) \text{ or } f_i$$

and a second signal component having a lower sideband of the frequency $f_c-(f_c-f_0)$ or $f_0$. The filter 22 is designed to pass only these lower sideband signals to the output terminal 23. Thus, the reference component and the information component appear at the output terminal 23 as they are received at the receiver 12 but with the random, unwanted changes in frequency substantially removed.

In an alternative embodiment, the filter 17 passes the upper sideband and the filter 19 passes the lower sideband. The operation of this alternative emodiment is essentially the same as that described above, with the exception that modulator 18 is used to perform the inversion of the frequency error $\Delta f$ rather than the modulator 15. Thus, the signal at the output of the filter 17 has a frequency $f_c+f_0\pm\Delta f$. When this signal is modulated with the input signal in the modulator 18, the lower sideband of the resulting signal, which is filtered by the filter 19, will contain two components. The frequency of the first will be $$f_c+f_0\pm\Delta f-(f_i\pm\Delta f)$$

or $f_c+f_0-f_i$, and the frequency of the second will be $f_c+f_0\pm\Delta f-(f_0\pm\Delta f)$ or $f_c$. As in the first case, the frequencies of the signal at the output of the filter 19 remain constant regardless of the direction or amount of the frequency error $\Delta f$. The original signal components of frequencies $f_i$ and $f_0$ may be obtained by modulating a signal of frequency $f_c+f_0$ with the signal at the output of the filter 19 and taking the lower sideband. Thus the oscillator 21 generates a signal of frequency $f_c+f_o$. This signal is then modulated with the output of the filter 19 in the modulator 21. The filter 22 passes the lower sideband.

The accuracy of the arrangement shown in FIG. 1 depends on the degree to which the separation of the frequencies of the two oscillators 16 and 21 is maintained at the frequency of the reference component $f_0$ as originally generated at the transmitter 10. If these oscillators are of the crystal type, the separation may be maintained to a high degree of accuracy.

The frequencies of the first and second oscillators 16 and 21 are not in themselves critical as long as their difference is maintained at the reference frequency $f_0$. However, best results are obtained when the desired sidebands of the outputs of the three modulators 15, 18 and 20 are free from interference with other signals. This depends on the particular modulation technique employed and the maximum frequency of the received signal. In general it is sufficient if the frequency of the lower frequency oscillator is greater than twice the maximum frequency of the incoming signal.

As an example of the operation of the present invention, it might be employed at the receiving end of a cable network over which a signal is being transmitted. Assume, for example, that the information frequency $f_i$ covers a band of from 1 kc. (kilocycles) to 4 kc. and the reference component is a pilot tone of 300 c.p.s. Assuming further that the maximum frequency error to be expected is $\pm 10$ c.p.s., the frequency $f_c$ of the first oscillator 16 might be, for example, 10.3 kc. and that of the second oscillator would then be 10.0 kc. where filter 17 is a lower sideband filter or 10.6 kc. where filter 17 is an upper sideband filter. The correction signal produced at the output of the filter 17 will have the frequency 10.0 kc. $\mp 10$ c.p.s. or 10.6 kc. $\pm 10$ c.p.s. respectively depending on the characteristic chosen for the filter 17. The feed-forward technique described serves to substantially eliminate the frequency error.

For most applications the feed-forward arrangement described with reference to FIG. 1 serves to correct the frequency error in substantially the same signal interval from which the correction signal was derived. Timing inaccuracies brought about by the frequency correction processes are avoided. However, the loop including the filter 14, modulator 15 and the filter 17 does introduce some delay in the correction signal relative to the received signal. This delay is in most applications small enough so that substantial cancellation of the frequency error takes place when the signal at the output of the filter 17 is combined directly with the received signal at the output of the receiver 12 in the modulator 18. However, in applications where the amount of frequency error changes rapidly as well as in a random manner, which can occur when the transmission medium 11 is subject to a Doppler effect, for example, the delay introduced in the feed-forward loop can become critical.

Assume that at some time, $t_1$, there exists at the output of the receiver 12 a signal in error by an amount $\Delta f$, as explained above. This signal is then subject to processing by the two filters 14 and 17 and the modulator 15. This processing introduces in general a delay so that an indication of the error $\Delta f_1$ appears at the output of the second filter 17 at time $t_2$. But at time $t_2$ the frequency error at the input of the system is $\Delta f_2$ which in general is not equal to $\Delta f_1$. As pointed out above, in the majority of cases $$\frac{d\Delta f}{dt}$$

is so small that $\Delta f_2 \cong \Delta f_1$ and the embodiment of FIG. 1 operates to provide the proper frequency correction. However, in certain cases the values of the percentage change in frequency error during the time $t_1$ to $t_2$ or $\Delta t$ may be sufficiently great so that such correction is not possible. Thus, where $$\frac{\frac{d\Delta f}{dt}(\Delta t)}{\Delta f} \geq A$$

A being a number less than 1, representing the acceptable level of error, and $\Delta t$ being the time delay introduced over the feed-forward loop between the output of receiver 12 and the output of filter 17, it is desirable that some compensation for the delay introduced over the feed-forward loop be provided. A suitable arrangement is shown in FIG. 2.

FIG. 2, in which like numbers refer to corresponding elements of FIG. 1, shows a second embodiment of the invention. A system essentially the same as that of FIG. 1 is shown, with the exception that a delay unit 50 is interposed between the output of the receiver 12 and the input of the first modulator 18. The delay unit 50 may take many forms, for example, a delay line, and is preferably one which provides substantially the same delay to all frequencies of the received signal.

The operation of the embodiment shown in FIG. 2 is essentially the same as that of FIG. 1 with the exception that the signal at the output of the receiver 12 is delayed by the delay unit 50 before it is fed to the first modulator 18. The amount of delay introduced by the delay unit 50 is made equal to the delay introduced over the feed-forward loop including the two filters 14 and 17 and the first modulator 15. The delay unit 50 serves to match the correction signal to the received signal so that the proper correction of a frequency error present at the received signal results.

What is claimed is:

1. A system for correcting frequency error introduced in a signal of the type including a reference component, said system comprising (1) first means for separating said reference component from said first-mentioned signal;

(2) second means connected to the output of said first means generating a second signal at a frequency equal to a local reference frequency minus the frequency of said reference component;

(3) frequency shifting means connected to the output of said second means and responsive to said first-mentioned signal for increasing the component frequencies of said first-mentioned signal by an amount equal to the frequency of said second signal;

(4) an oscillator generating a third signal at a frequency equal to said local reference frequency minus the frequency of said reference component without said frequency error;

(5) an amplitude modulator having two inputs, one connected to the output of said oscillator and the other connected to the output of said frequency shifting means, for modulating the output of said frequency shifting means with the output of said oscillator to produce a further signal having upper and lower sidebands; and (6) a filter connected to the output of said amplitude modulator for suppressing all but said lower sideband.

2. A system for correcting frequency error introduced in a signal of the type including a reference component, (1) a first filter for separating said reference component from said signal;

(2) first and second oscillators, the frequency of the signal generated by the first being greater than the frequency of the signal generated by the second by an amount equal to the frequency of said reference component without said error;

(3) a first amplitude modulator having two inputs, one connected to the output of said first filter and the other connected to the output of said first oscillator for modulating the output of said first oscillator with the output of said first filter to produce a fourth signal having upper and lower sidebands;

(4) a second filter connected to the output of said first modulator for filtering from the output of said first modulator all but said lower sideband;

(5) means for delaying said first mentioned signal for a period equal to the signal processing time of said first filter, said first amplitude modulator and said second filter;

(6) a second amplitude modulator having two inputs, one connected to the output of said second filter and the other connected to the output of said delay means, for modulating the output of said second filter with the output of said delay means to produce a fifth signal having upper and lower sidebands;

(7) a third filter connected to the output of said second amplitude modulator for filtering from said fifth signal all but said upper sideband;

(8) a third amplitude modulator having two inputs, one connected to the output of said third filter and the other connected to the output of said second oscillator for producing a sixth signal having upper and lower sidebands; and (9) a fourth filter for filtering from the output of said third modulator all but said lower sideband of said sixth signal.

References Cited

UNITED STATES PATENTS

| | | | |
|---|---|---|---|
| 3,008,043 | 11/1961 | Caulk | 325—421 |
| 3,305,632 | 2/1967 | Court et al. | 325—432 X |

KATHLEEN H. CLAFFY, *Primary Examiner.*

R. LINN, *Assistant Examiner.*